United States Patent
Domino et al.

(10) Patent No.: US 7,400,862 B2
(45) Date of Patent: Jul. 15, 2008

(54) TRANSMIT-RECEIVE SWITCH ARCHITECTURE PROVIDING PRE-TRANSMIT ISOLATION

(75) Inventors: William J. Domino, Yorba Linda, CA (US); Peter Hagn, Finsing (DE)

(73) Assignee: Skyworks Solutions, Inc., Irvine, CA (US)

(*) Notice: Subject to any disclaimer, the term of this patent is extended or adjusted under 35 U.S.C. 154(b) by 579 days.

(21) Appl. No.: 10/972,626

(22) Filed: Oct. 25, 2004

(65) Prior Publication Data

US 2006/0089107 A1    Apr. 27, 2006

(51) Int. Cl.
*H04B 1/44* (2006.01)

(52) U.S. Cl. .............................. 455/78; 455/73; 455/83; 333/103

(58) Field of Classification Search .............. 455/165.1, 455/127.1, 126, 118, 553.1, 13.3, 73, 78–88, 455/90.3, 129–130, 333, 550.1, 575.1, 313; 330/134; 333/100–105, 262, 204; 257/275, 257/347–354, 342, 728, 664, 724; 327/365, 327/379, 389
See application file for complete search history.

(56) References Cited

U.S. PATENT DOCUMENTS

| | | | | |
|---|---|---|---|---|
| 4,982,442 A | * | 1/1991 | Sarokhanian | 455/83 |
| 5,166,857 A | * | 11/1992 | Avanic et al. | 361/280 |
| 5,926,075 A | * | 7/1999 | Hayashi | 333/101 |
| 6,078,797 A | * | 6/2000 | Kashimura | 455/234.1 |
| 6,332,071 B1 | * | 12/2001 | Brandt | 455/82 |
| 6,351,628 B1 | * | 2/2002 | Leizerovich et al. | 455/83 |
| 6,356,536 B1 | * | 3/2002 | Repke | 370/282 |
| 6,445,261 B1 | * | 9/2002 | Yuda et al. | 333/133 |
| 6,586,786 B2 | * | 7/2003 | Kitazawa et al. | 257/275 |
| 6,757,523 B2 | * | 6/2004 | Fry | 455/78 |
| 6,862,441 B2 | | 3/2005 | Ella | |
| 6,882,829 B2 | * | 4/2005 | Mostov et al. | 455/83 |
| 6,903,606 B1 | | 6/2005 | Yan et al. | |
| 6,987,950 B2 | * | 1/2006 | Coan | 455/78 |
| 7,035,602 B2 | * | 4/2006 | Satoh et al. | 455/118 |
| 2002/0086644 A1 | | 7/2002 | Koshkinen | |
| 2003/0141515 A1 | * | 7/2003 | Kitazawa et al. | 257/107 |
| 2003/0186667 A1 | | 10/2003 | Wallace | |
| 2003/0190895 A1 | * | 10/2003 | Mostov et al. | 455/78 |
| 2004/0018819 A1 | * | 1/2004 | Coan | 455/83 |
| 2004/0033787 A1 | * | 2/2004 | Weber et al. | 455/78 |
| 2004/0127182 A1 | | 7/2004 | Hayashi | |
| 2004/0171356 A1 | * | 9/2004 | Uriu et al. | 455/83 |
| 2004/0217914 A1 | | 11/2004 | Yamashita et al. | |
| 2005/0079829 A1 | * | 4/2005 | Ogawa et al. | 455/83 |
| 2005/0227643 A1 | * | 10/2005 | Brindle et al. | 455/127.1 |
| 2006/0046774 A1 | * | 3/2006 | Fukuda | 455/556.1 |
| 2006/0141943 A1 | * | 6/2006 | De Graauw | 455/78 |

* cited by examiner

*Primary Examiner*—Pablo N Tran

(57) ABSTRACT

A transmit-receive switch architecture comprises a first switch coupled to transmit circuitry and to an antenna, a second switch coupled to receive circuitry and to ground, wherein the second switch is configured to couple the receive circuitry to ground during a time period in which a power source associated with the transmit circuitry is enabled.

21 Claims, 7 Drawing Sheets

TRANSMIT-RECEIVE SWITCH ARCHITECTURE PROVIDING PRE-TRANSMIT ISOLATION

BACKGROUND OF THE INVENTION

1. Field of the Invention

This invention relates generally to transceiver architecture in a wireless portable communication device. More particularly, the invention relates to a transmit-receive switch architecture providing pre-transmit isolation.

2. Related Art

With the increasing availability of efficient, low cost electronic modules, mobile communication systems are becoming more and more widespread. For example, there are many variations of communication schemes in which various frequencies, transmission schemes, modulation techniques and communication protocols are used to provide two-way voice and data communications in a handheld, telephone-like communication handset. The different modulation and transmission schemes each have advantages and disadvantages.

As these mobile communication systems have been developed and deployed, many different standards, to which these systems must conform, have evolved. For example, in the United States, third generation portable communications systems comply with the IS-136 standard, which requires the use of a particular modulation scheme and access format. In the case of IS-136, the modulation scheme can be 8-quadrature phase shift keying (8QPSK), offset π/4 differential quadrature phase shift keying (π/4-DQPSK) or variations thereof and the access format is TDMA.

In Europe and in other parts of the world, the global system for mobile communications (GSM) standard requires the use of the gaussian minimum shift keying (GMSK) modulation scheme in a narrow band TDMA access environment, which uses a constant envelope modulation methodology. The GSM communication standard has been further developed into what is referred to as the enhanced data rates for GSM evolution, referred to as EDGE, which uses 8-quadrature phase shift keying (8QPSK). In Europe and in many other regions the GSM communication system operates in the 900 MHz "EGSM900" band and the 1800 MHz "DCS1800" band, while in the Americas it operates in the 850 MHz "GSM850" band and the 1900 MHz "PCS1900" band. Each of the GSM variants uses different transmit and receive frequencies.

For efficiency of deployment, in some instances it is desirable to provide a single communication device that can be used in more than one communication system. These so called "multi-mode" or "multi-band" communication devices are capable of providing communications access in two or more communications systems (multi-mode), or two or more bands (multi-band). For example, in the GSM communications system, some communications devices are capable of operating in the GSM850, EGSM900, DCS1800 and PCS1900 frequency bands. Even though the PCS1900 transmit band overlaps the DCS1800 receive band, and the GSM850 receive band overlaps the EGSM900 transmit band, these communications devices can provide the capability to operate in all of these bands because they only operate in one band at any given time.

Unfortunately however, due to the frequency overlap between the PCS1900 transmit band and the DCS1800 receive band, there is an operating situation in which leakage from the transmit section in the PCS1900 band may leak through the receive section of the DCS1800 band, and in which leakage from the transmit section in the EGSM900 band may leak through the receive section of the GSM850 band. The operating condition arises because the GSM transmit time mask specification requires stringent adherence to power output limitations. For example, during what is referred to as a "pre-transmit time" a transmit voltage controlled oscillator (TX VCO) associated with the DCS1800/PCS1900 transmit section of the communication device is activated to stabilize frequency prior to transmitting, but the communication device is not permitted to transmit until a prescribed time. Specifically, the level of any emitted power must be below a specified limit during the pre-transmit time. To prevent any transmit power from being emitted during this pre-transmit time, one or more transmit/receive switches in the communication device are maintained in a receive position, thus preventing any significant transmit power from being emitted by the transmit circuitry in the communication device during the pre-transmit time. Unfortunately, because the PCS1900 transmit band overlaps the DCS1800 receive band, power from the TX VCO may leak through the DCS1800 receive band circuitry to the antenna, particularly through the surface acoustic wave (SAW) filter associated with the DCS1800 receive circuitry.

FIG. 1 is a schematic diagram illustrating an exemplary front end module (FEM) 10 of a communication device. The front end module 10 comprises an antenna 11 coupled to a diplexer 12. The diplexer separates frequency bands and provides, in this example, GSM850/EGSM900 transmit/receive signals via connection 14 and the DCS1800/PCS1900 transmit/receive signals via connection 16. The front end module 10 illustrates an architecture that combines GSM850, EGSM900, DCS1800, and PCS1900 (also considered within the GSM framework) communication bands on a single portable communication device. This architecture is also referred to as "quadband." For simplicity of description, only the DCS1800/PCS1900 frequency bands will be discussed. The signal on connection 16 is coupled to a transmit-receive switch 18. The transmit-receive switch 18 can be, for example, fabricated using a gallium arsenide (GaAs) field effect transitor (FET) or any other switch. The transmit-receive switch 18 determines whether a signal received by the antenna 11 will be delivered to receive circuitry or whether a transmit signal will be delivered to the antenna 11 from the transmitter circuitry.

In the receive path, the transmit-receive switch 18 is coupled via connection 38 to a pair of surface acoustic wave (SAW) filters 41 and 42. The surface acoustic wave filter 41 is tuned to receive signals in the DCS1800 communication band while the surface acoustic wave filter 42 is tuned to receive signals in the PCS1900 communication band. In addition, a transmit filter 44 allows the passage of DCS1800 and PCS1900 transmit signals from the power amplifier 49 via connection 48. The surface acoustic wave filter 41 should present a high impedance in the band in which the surface acoustic wave filter 42 operates. Similarly, the surface acoustic wave filter 42 should present a high impedance in the band in which the surface acoustic wave filter 41 operates. This impedance condition may be met in a variety of ways as known in the art.

A transceiver 37 includes a transmit voltage control oscillator (TX VCO) 36 for the GSM850/EGSM900 transmit bands and a TX VCO 52 for the DCS1800/PCS1900 transmit bands. The TX VCO 52 is coupled to the transmit power amplifier 49 via connection 51. The transceiver 37 also includes a low noise amplifier (LNA) 33 for the GSM850 receive band coupled to the surface acoustic wave filter 27 via connection 29, and an LNA 34 for the EGSM900 receive band coupled to the surface acoustic wave filter 26 via connection 28. The transceiver 37 also includes an LNA 54 coupled to the surface acoustic wave filter 41 in the DCS1800 receive band via connection 46, and an LNA 55 coupled to the surface acoustic wave filter 42 in the PCS1900 receive band via connection 47.

The following description will be directed to the DCS1800/PCS1900 bands, but is also applicable to the GSM850/EGSM900 bands. When communicating using time division duplex (TDD) or time division multiple access (TDMA), as used in the GSM communication methodology, there is a portion of the communication time, referred to as the "pretransmit" time, during which the switch 18 remains in the receive position, as shown in FIG. 1, and during which time the TX VCO 52 is activated to power-up and stabilize prior to transmitting. During this pre-transmit time period, and because the PCS1900 transmit band overlaps the DCS1800 receive band, a PCS1900 transmit signal emitted from the TX VCO 52 may leak through the DCS1800 receive path, through the surface acoustic wave filter 41, as shown using reference numeral 60. This leakage path 60 occurs due to the TX VCO 52 being active, and being in close proximity to the receive port 46 of the low noise amplifier 54. Further, leakage from the TX VCO 52 may propagate to other portions of the transceiver 37. This transmit signal leakage through the receive path to the antenna 11 may cause the portable communication device to violate the allowed GSM transmit time mask.

FIG. 2 is a graphical illustration 70 showing an exemplary transmit power curve of a portable communication device operating in the GSM communication environment. The horizontal axis 71 represents time and the vertical axis 72 represents transmit power. The GSM communication system transmits power in what are referred to as "transmit bursts" which occur during carefully controlled time periods. The curve 76 illustrates the transmit power output of the antenna 11 of FIG. 1. The mask 74 represents the GSM transmit spectrum within which the transmit power curve 76 must remain.

During a pre-transmit time, illustrated using reference numeral 77, the TX VCO 52 is on, while the switch 18 (FIG. 1) remains in a receive mode to attempt to prevent transmit power from reaching the antenna 11 (FIG. 1). During this time period 77 the TX VCO 52 (FIG. 1) is on, but is not allowed to transmit. However, as mentioned above, transmit power may leak through the receive path as described above and may cause a portable communication device to violate the GSM transmit spectrum mask 74.

Prior solutions, which isolate the DCS1800 receive circuitry from the PCS1900 transmit circuitry during pre-transmit and transmit time (and which isolate the GSM850 receive circuitry from the EGSM900 transmit circuitry), include additional switches to select the different receive band ports. Unfortunately, additional switches raise the cost and the complexity of the communication device.

Therefore, it would be desirable to efficiently reduce or eliminate any radio frequency (RF) power emitted by a communication device through the receive circuitry.

SUMMARY

Embodiments of the invention include a transmit-receive switch architecture comprising a first switch coupled to transmit circuitry and to an antenna, and a second switch coupled to receive circuitry and to ground, wherein the second switch is configured to couple the receive circuitry to ground during a time period in which a power source associated with the transmit circuitry is enabled.

Related methods of operation are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
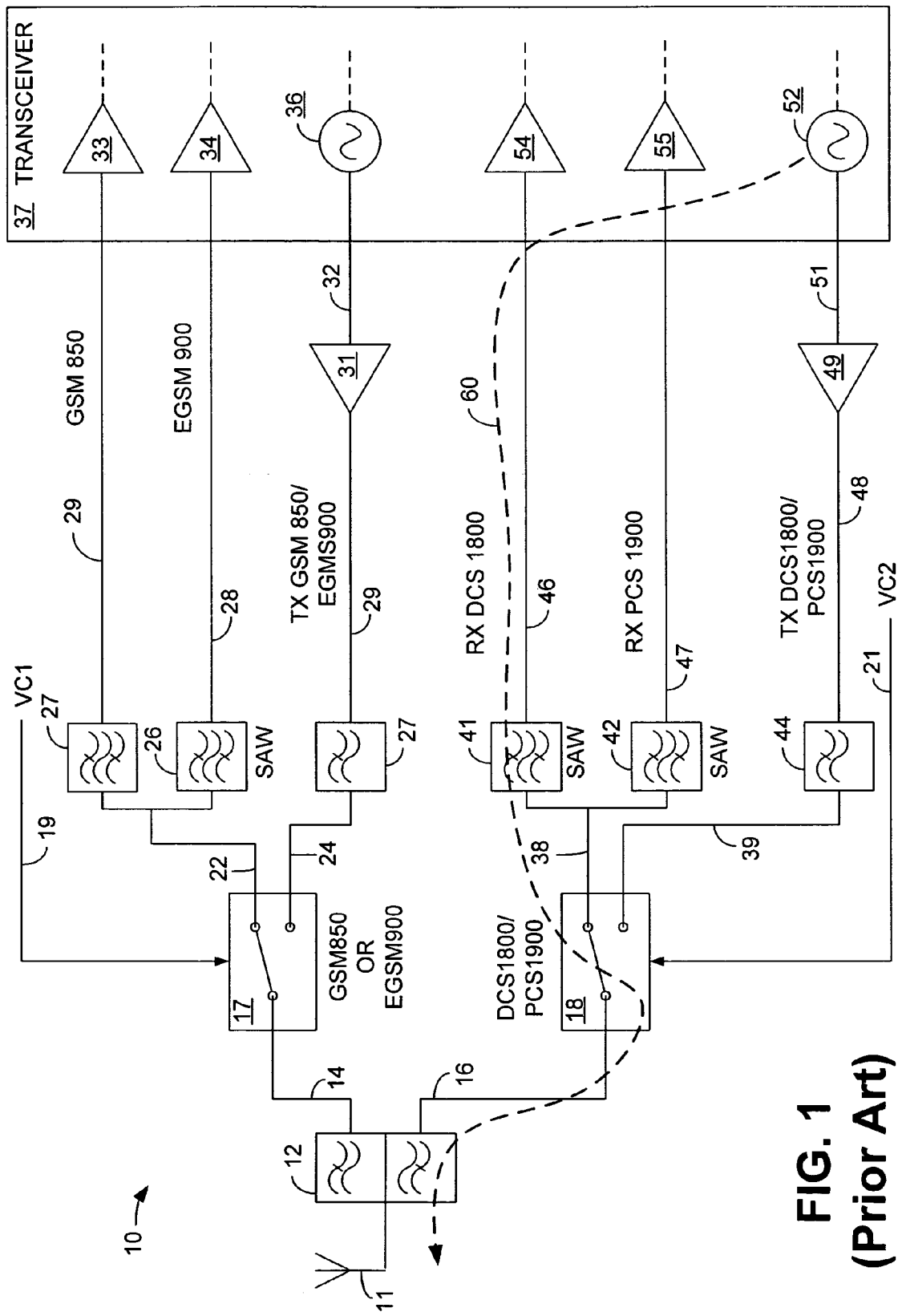
FIG. 1 is a schematic diagram of an exemplary prior art front end module (FEM) of a portable communication device.
Figure 2:
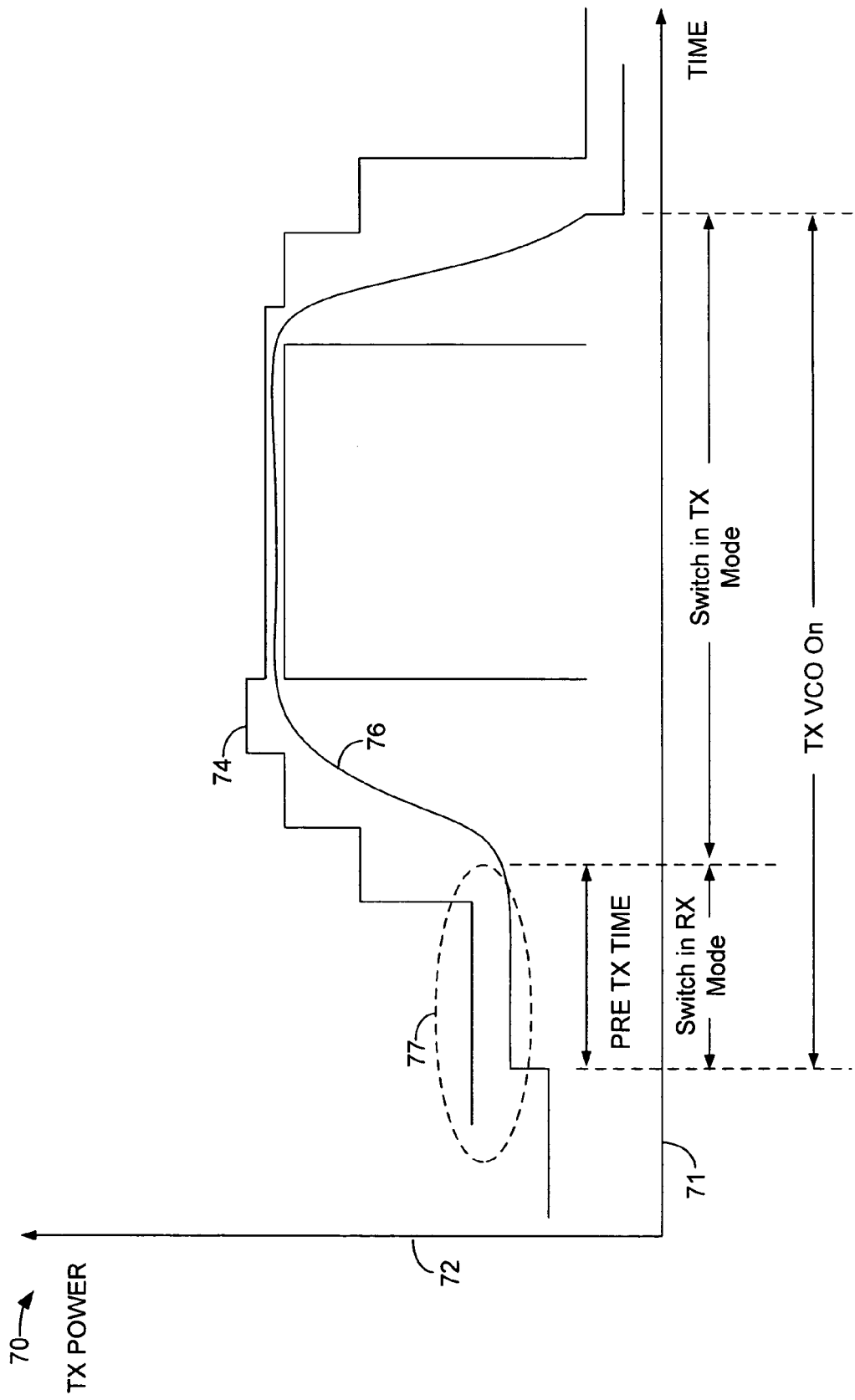
FIG. 2 is a graphical illustration of the transmit power and a spectral power transmit mask of a global system for mobile communication (GSM) communication device.

Although described with particular reference to the global system for mobile communication (GSM) 1800/1900 MHz communication bandwidth, the transmit-receive switch architecture can be implemented in any communication device at least partially implementing time division duplex (TDD)/time division multiple access (TDMA) access methodology, using a switch, or switches, to separate transmit and receive time slots, and in which there is at least partial frequency overlap between any transmit band and any receive band over which the communication device can operate.

The transmit-receive switch architecture can be implemented in hardware, software, or a combination of hardware and software. When implemented in hardware, the transmit-receive switch architecture can be implemented using specialized hardware elements and logic. When the transmit-receive switch architecture is implemented partially in software, the software portion can be used to control the switch components so that various operating aspects can be software-controlled. The software can be stored in memory and executed by a suitable instruction execution system (microprocessor). The hardware implementation of the transmit-receive switch architecture can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the transmit-receive switch architecture comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
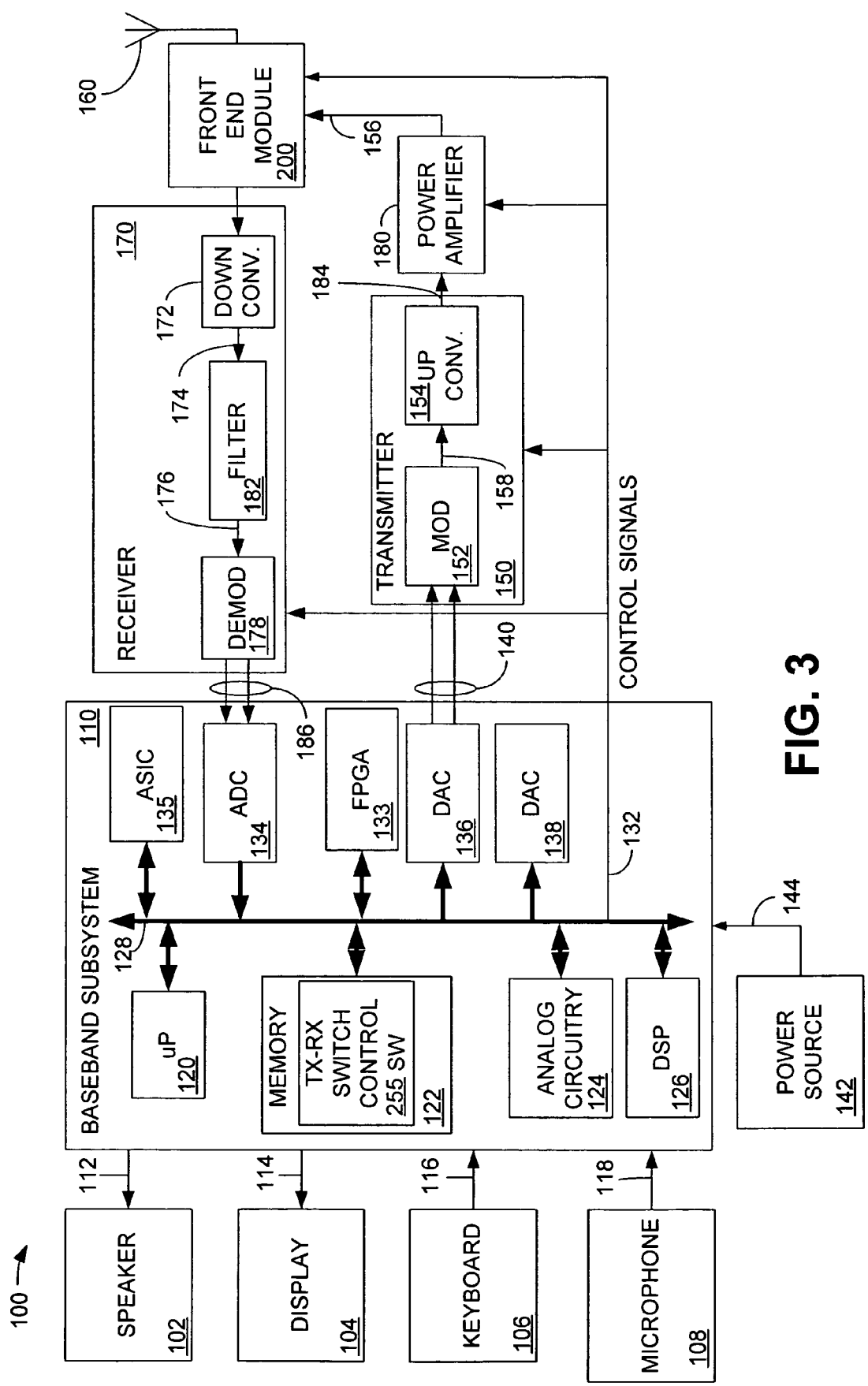
FIG. 3 is a block diagram illustrating a simplified portable transceiver.

FIG. 3 is a block diagram illustrating a simplified portable transceiver 100 including a front end module including the transmit-receive switch architecture. The portable transceiver 100 includes speaker 102, display 104, keyboard 106, and microphone 108, all connected to baseband subsystem 110. A power source 142, which may be a direct current (DC) battery or other power source, is also connected to the baseband subsystem 110 via connection 144 to provide power to the portable transceiver 100. In a particular embodiment, portable transceiver 100 can be, for example but not limited to, a portable telecommunication handset such as a mobile cellular-type device. Speaker 102 and display 104 receive signals from baseband subsystem 110 via connections 112 and 114, respectively, as known to those skilled in the art. Similarly, keyboard 106 and microphone 108 supply signals to baseband subsystem 110 via connections 116 and 118, respectively. Baseband subsystem 110 includes microprocessor (μP) 120, memory 122, analog circuitry 124, and digital signal processor (DSP) 126 in communication via bus 128. Bus 128, although shown as a single bus, may be implemented using multiple busses connected as necessary among the subsystems within baseband subsystem 110.

Depending on the manner in which the transmit-receive switch architecture is implemented, the baseband subsystem 110 may also include an application specific integrated circuit (ASIC) 135 and a field programmable gate array (FPGA) 133.

Microprocessor 120 and memory 122 provide the signal timing, processing and storage functions for portable transceiver 100. Analog circuitry 124 provides the analog processing functions for the signals within baseband subsystem 110. Baseband subsystem 110 provides control signals to transmitter 150, receiver 170 and the front end module 200 via connection 132. The control signals on connection 132 may originate from the DSP 126, the ASIC 135, the FPGA 133, or from microprocessor 120, or other components, and are supplied to a variety of connections within the transmitter 150, the receiver 170, the front end module 200 and other components. It should be noted that, for simplicity, only the basic components of portable transceiver 100 are illustrated herein.

The control signals provided by the baseband subsystem 110 control the various components within the transmitter 150, the receiver 170 and other components. Further, the function of the transmitter 150 and the receiver 170 may be integrated into a transceiver. Depending on the manner in which the transmit-receive switch architecture is implemented, the baseband subsystem 110 may send control signals directly to the front end module 200 via connection 132, or the control information may be directed first to the transmitter 150 and/or the receiver 170, which then may forward the control signals to the front end module 200.

If portions of the transmit-receive architecture are implemented in software that is executed by the microprocessor 120, or another device, the memory 122 will also include transmit-receive switch control software 255. The transmit-receive switch control software 255 comprises one or more executable code segments that can be stored in the memory and executed in the microprocessor 120 or another device. Alternatively, the functionality of the transmit-receive switch control software 255 can be coded into the ASIC 135 or can be executed by the FPGA 133. Because the memory 122 can be rewritable and because the FPGA 133 is reprogrammable, updates to the transmit-receive switch control software 255 can be remotely sent to and saved in the portable transceiver 100 when implemented using either of these methodologies.

Baseband subsystem 110 also includes analog-to-digital converter (ADC) 134 and digital-to-analog converters (DACs) 136 and 138. Although DACs 136 and 138 are illustrated as two separate devices, it is understood that a single digital-to-analog converter may be used that performs the function of DACs 136 and 138. ADC 134, DAC 136 and DAC 138 also communicate with microprocessor 120, memory 122, analog circuitry 124 and DSP 126 via bus 128. DAC 136 converts the digital communication information within baseband subsystem 110 into an analog signal for transmission to a modulator 152 via connection 140. Connection 140, while shown as two directed arrows, includes the information that is to be transmitted by the transmitter 150 after conversion from the digital domain to the analog domain.

The transmitter 150 includes modulator 152, which modulates the analog information in connection 140 and provides a modulated signal via connection 158 to upconverter 154. The upconverter 154 transforms the modulated signal on connection 158 to an appropriate transmit frequency and provides the upconverted signal to a power amplifier 180 via connection 184. The power amplifier amplifies the signal to an appropriate power level for the system in which the portable transceiver 100 is designed to operate. Details of the modulator 152 and the upconverter 154 have been omitted for simplicity, as they will be understood by those skilled in the art. For example, the data on connection 140 is generally formatted by the baseband subsystem 110 into in-phase (I) and quadrature (Q) components. The I and Q components may take different forms and be formatted differently depending upon the communication standard being employed.

The power amplifier 180 supplies the amplifier signal via connection 156 to front end module (FEM) 200. The power amplifier 180 also receives control signals via connection 132. As will be described below, the front end module 200 typically includes a diplexer for separating frequency bands, one or more transmit-receive switches for directing the transmit and receive signals to the transmit and receive circuitry, respectively, and includes the various transmit and receive filters. Alternatively, an antenna switch module (ASM) may be implemented in place of the FEM 200, in which case the transmit and receive filters are located elsewhere.

A signal received by antenna 160 will be directed from the FEM 200 to the receiver 170. The receiver 170 includes a downconverter 172, one or more filters 182, and a demodulator 178. If implemented using a direct conversion receiver (DCR), the downconverter 172 converts the received signal from an RF level to a baseband level (DC). Alternatively, the received RF signal may be downconverted to an intermediate frequency (IF) signal, depending on the application. The downconverted signal is sent to the filter 182 via connection 174. The filter comprises a least one filter stage to filter the received downconverted signal as known in the art.

The filtered signal is sent from the filter 182 via connection 176 to the demodulator 178. The demodulator 178 recovers the transmitted analog information and supplies a signal representing this information via connection 186 to ADC 134. ADC 134 converts these analog signals to a digital signal at baseband frequency and transfers the signal via bus 128 to DSP 126 for further processing.

Figure 4:
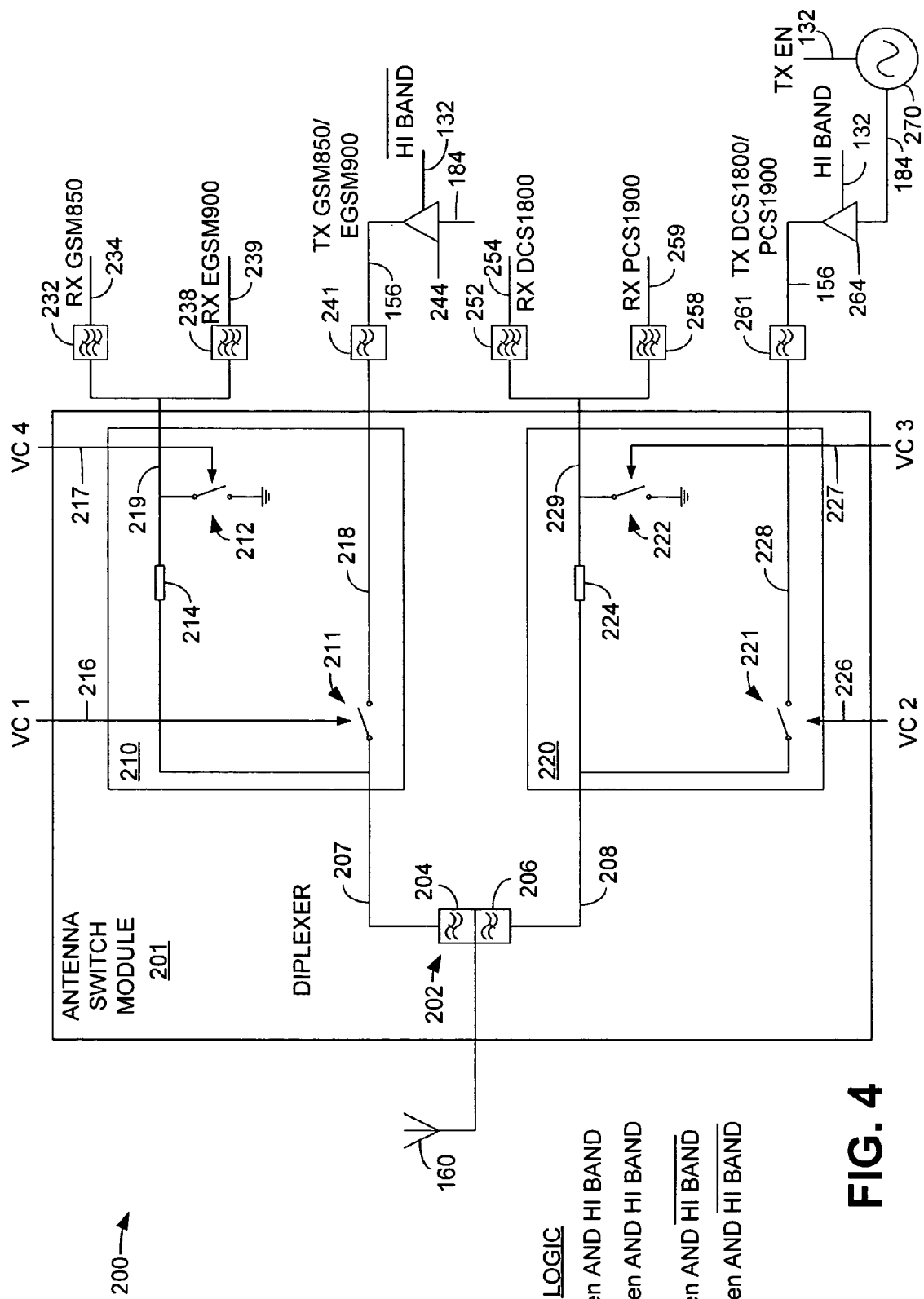
FIG. 4 is a schematic diagram illustrating an embodiment of a front end module including an embodiment of the transmit-receive switch architecture for providing pre-transmit isolation.

FIG. 4 is a schematic diagram illustrating an embodiment of a front end module 200 including an embodiment of the transmit-receive switch architecture for providing pre-transmit isolation (hereafter referred to as the "transmit-receive switch architecture"). The front end module 200 includes a diplexer 202 configured to filter a first frequency band 204 and a second frequency band 206. In this embodiment, the first frequency band 204 includes the GSM850 and EGSM900 communication bands and the second frequency band 206 includes the DCS1800 and PCS1900 GSM communication bands. The frequency band 204 of the diplexer 202 is coupled via connection 207 to transmit-receive switch 210 and the frequency band 206 of the diplexer 202 is coupled via connection 208 to the transmit-receive switch 220. The transmit-receive switches 210 and 220 are similar in construction. The transmit-receive switch 210 is referred to as the "lo band" switch and the transmit-receive switch 220 is referred to as the "hi band" switch. The diplexer 202 and the switches 210 and 220 comprise what is referred to as an antenna switch module (ASM) 201. Although the problem of transmit power leakage from the transmit path through the receive path is likely to occur in both the EGSM900 transmit band and in the PCS1900 transmit band, the following description will focus only on the transmit-receive switch 220 and the associated DCS1800/PCS1900 transmit and receive circuitry. The description of the operation of the transmit-receive switch 220 is likewise applicable to the transmit receive switch 210.

The transmit-receive switch 220 includes a first switch 221 and a second switch 222. The first switch 221 is coupled between connection 208 and connection 228, to the 1800/1900 MHz transmit circuitry comprising transmit filter 261, power amplifier 264 and TX VCO 270. The power amplifier 264 receives the signal to be transmitted via connection 184 from the TX VCO 270, and receives one or more control signals via connection 132 to enable, in this embodiment, 1800/1900 MHz transmit output via connection 156. The control signal referred to as "HI BAND" selects which power amplifier is to transmit, either power amplifier 264 (HI BAND=logic high), or power amplifier 244 (HI BAND=logic low). This control signal is supplied via connection 132. In this description of the 1800/1900 MHz transmit circuitry, HI BAND is set to logic high. The TX VCO receives a transmit enable (TXen) signal via connection 132, which activates the TX VCO 270. After the TX VCO 270 takes a pre-specified amount of time to stabilize, the power amplifier 264 is enabled via another signal (PAen, shown in FIG. 6) on connection 132. Just after the power amplifier 264 is enabled, an antenna enable (ANTen, shown in FIG. 6) signal is activated when the time arrives for transmission to begin. The ANTen signal connects the power amplifier 264 to the antenna 160 by closing switch 221 as will be described below.

The second switch 222 is coupled between a wave transmission line 224, which in this embodiment is a ¼ wave transmission line, and ground. The ¼ wave transmission line 224 is coupled between connection 208 and connection 229, which is also referred to as the receive port. The second switch 222 is also coupled to connection 229. Connection 229 also couples to the surface acoustic wave filters 252 and 258. The surface acoustic wave filter 252 is designed to receive signals in the DCS1800 receive band while the surface acoustic wave filter 258 is designed to receive signals in the PCS1900 receive band.

Similarly, transmit receive switch 210 includes a first switch 211, a second switch 212, and a ¼ wave transmission line 214. The components within the transmit-receive switch 210 are configured similarly to the components within the transmit-receive switch 220. The receive port 219 is coupled to the surface acoustic wave filters 232 and 238 to receive signals in the GSM850 and EGSM900 communication bands, respectively.

In the transmit-receive switch 220, the first switch 221 is controlled by a control signal referred to as VC2 via connection 226 and the second switch 222 is controlled by a control signal referred to as VC3 via connection 227. Similarly, in the transmit-receive switch 210, the first switch 211 is controlled by a control signal referred to as VC1 supplied via connection 216, and the second switch 212 is controlled by a control signal referred to as VC4 via connection 217.

In accordance with an embodiment of the invention, for hi band transmit mode, which in this example is the DCS1800/PCS1900 transmit mode, the second switch 222 is activated by the voltage control signal VC3 via connection 227 when the transmit enable (TXen) signal (i.e., the signal that activates the TX VCO 270) is logic high and when the HI BAND signal is logic high. The switch 221 is enabled by the control signal VC2 when the antenna enable (ANTen) signal (i.e., the signal that activates the transmit path) and the HI BAND control signals are logic high. In this example, the signals VC3 and TXen could be the same, and the signals VC2 and ANTen could be the same, and are each gated by the signal HI BAND. In a dualband implementation (i.e., DCS1800/PCS1900) there is no HI BAND signal and VC3 and VC2 would be identical to TXen and ANTen, respectively. The power amplifier is enabled by a control signal on connection 132 referred to as "PAen," which is set to logic high at a time between when the TXen and ANTen signals are set to logic high.

Similarly, for low band transmit operation, the switch 212 is activated by the control signal VC4 when the control signal TXen is logic high and the control signal HI BAND is logic low. The switch 211 is activated by the control signal VC1 when the antenna ANTen signal is logic high and the HI BAND signal is logic low.

The switches 211 and 212 within the transmit-receive switch 210, and the switches 221 and 222 within the transmit-receive switch 220 can be implemented using different implementation methodologies. For example, as will be described below in FIG. 5, the switches 211, 212, 221 and 222 can be enabled using pin (p-type-intrinsic-n-type) diodes, field effect transistors (e.g., gallium arsenide (GaAs) field effect transistors (FETs)), or any other switching methodology.

Figure 5:
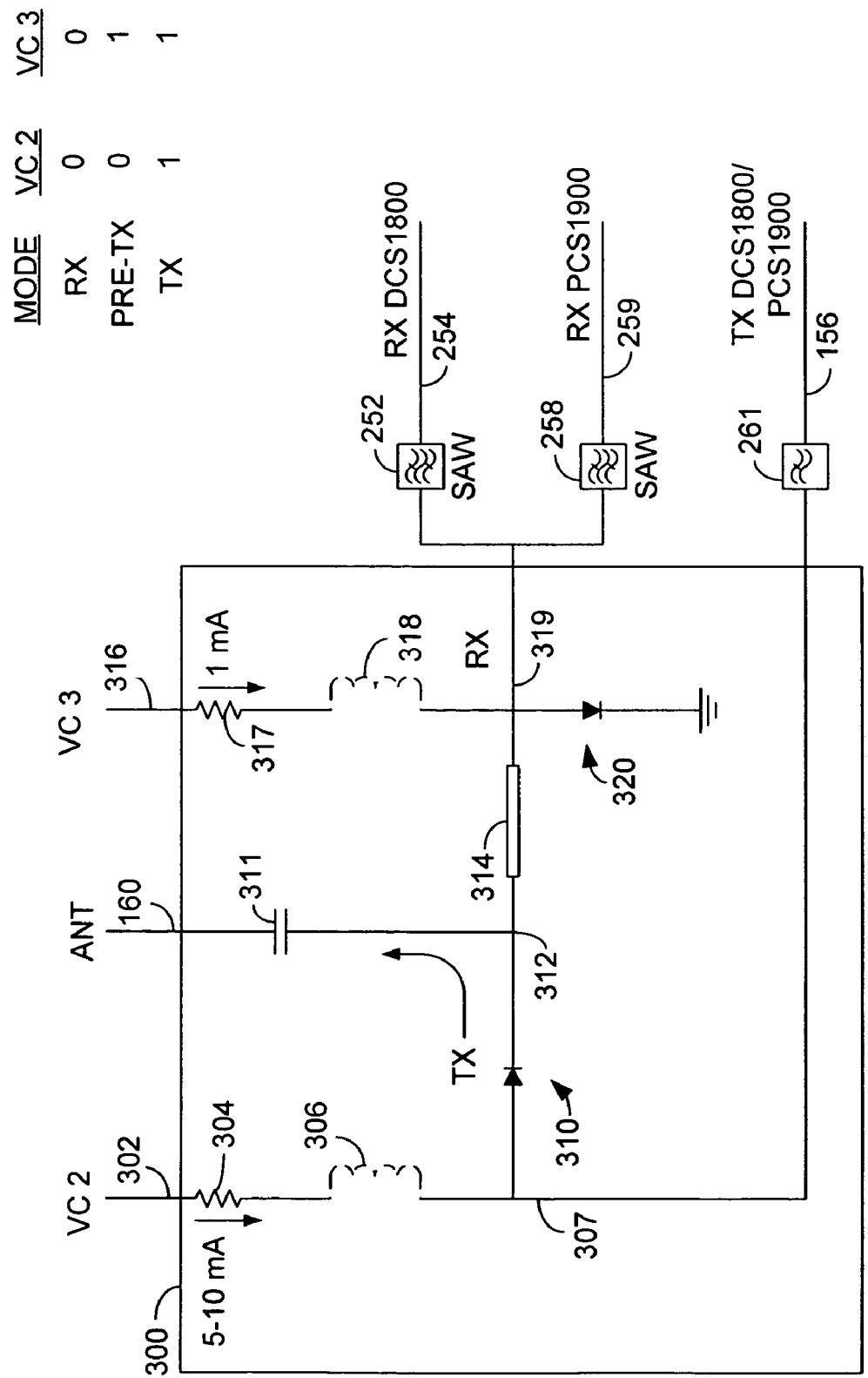
FIG. 5 is a schematic diagram illustrating one implementation embodiment of the transmit-receive switch of FIG. 4.

FIG. 5 is a schematic diagram illustrating one implementation of an embodiment of the transmit-receive switches 221 and 222 of FIG. 4. The transmit-receive switch 300 illustrates a p-type-intrinsic-n-type (pin) diode implementation of transmit-receive switch 220 (FIG. 4). A first pin diode 310, corresponding to first switch 221 of FIG. 4, is coupled to an antenna 160 through a capacitance 311. The pin diode 310 is also coupled to the voltage control signal VC2, through a resistance 304 and an inductance 306. The inductance 306 is shown as a dotted line to indicate that it is optional. The inductance 306 can be omitted (i.e., replaced by a short) if the resistance 304 is sufficiently large to prevent RF energy from leaking onto connection 302. The pin diode 310 is also coupled via connection 307 to the transmit filter 261, and the remainder of the DCS1800/PCS1900 transmit circuitry via connection 156.

The second pin diode 320, which corresponds to second switch 222 of FIG. 4, is coupled between ground and the receive port 319. The second pin diode 320 is also coupled to the voltage control signal VC3 through a resistance 317 and an optional inductance 318. The inductance 318 can be omitted (i.e., replaced by a short) if the resistance 317 is sufficiently large to prevent RF energy from leaking onto connection 316. In addition, a ¼ wave transmission line 314 is coupled between the antenna 160 and the receive port 319. The ¼ wave transmission line 314 rotates the impedance at node 319 by 180° to present a sufficiently high, and ideally infinite, impedance at node 312 when the first pin diode 310 and the second pin diode 320 are forward biased, thus ensuring that transmit power is directed to the antenna 160 when transmission is desired. Alternatively, the ¼ wave transmission line 314 (and the ¼ wave transmission lines 214 and 224 of FIG. 4) can be replaced by other impedance transformation circuits that can switch between a short and an open circuit. For example, an inductive-capacitive (LC) circuit may be implemented to perform the impedance transformation that is performed by the ¼ wave transmission lines. The second pin diode 320 is forward biased, thus shorting the receive port 319 to ground, thus isolating the receive circuitry from the antenna 160 and from the transmit path 307.

The receive port 319 is coupled to the DCS1800 receive band and associated surface acoustic wave filter 252 and to the PCS1900 receive band and associated surface acoustic wave filter 258. In accordance with an embodiment of the invention, it is desirable to isolate the DCS1800/PCS1900 transmit circuitry from the DCS1800 receive circuitry during the pre-transmit time, and throughout the transmit time. The operation of the transmit-receive switch architecture 300 will be described with reference to both FIG. 5 and FIG. 6.

Figure 6:
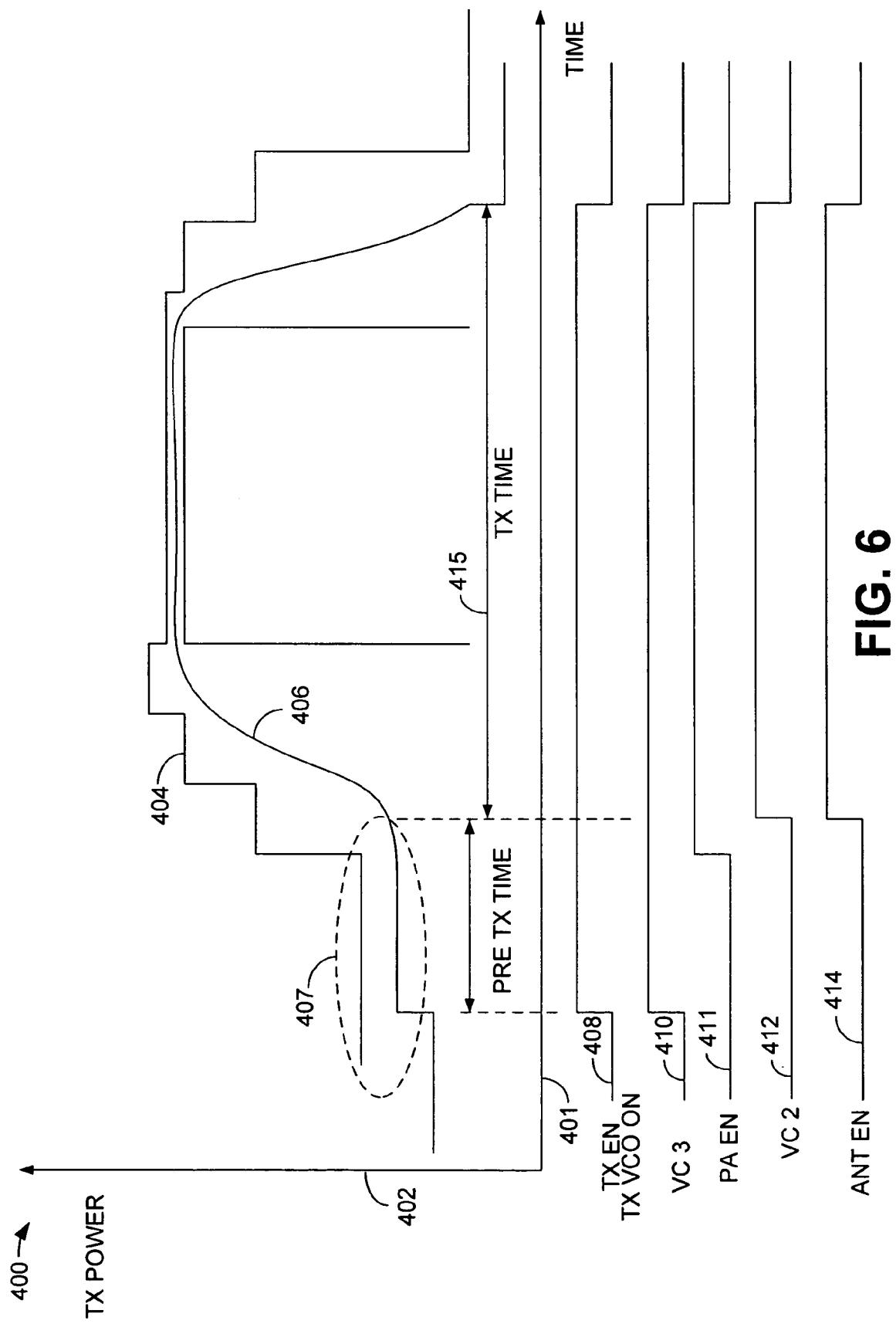
FIG. 6 is a graphical illustration showing the timing of control signals and the power output over time of a transmit signal burst.

FIG. 6 is a graphical illustration showing the timing of control signals and the power output over time of a transmit signal burst. The horizontal axis 401 represents time and the vertical axis 402 represents transmit power. The control signal TXen is shown at 408, the control signal VC3 is shown at 410, the control signal PAen is shown at 411, the control signal VC2 is shown at 412 and the control signal ANTen is shown at 414. The GSM transmit time mask is illustrated at 404, while the power amplifier output of the transmit circuitry is illustrated using curve 406. During a pre-transmit time, indicated at 407, the transmit enable signal (TXen) 408 is made logic high to activate and stabilize the TX VCO 270 (FIG. 4) prior to transmitting. Simultaneous with the activation of the TX VCO 270, the control signal VC3 (or VC4 for the low band circuitry (FIG. 4)), 410 is simultaneously activated with the TXen signal 408. In this manner, and referring to FIG. 5, the control signal VC3 forward biases the pin diode 320, thus shorting receive port 319 to ground, and accordingly, shunting the entire receive path to ground. In this manner, the receive port 319, and the surface acoustic wave filters 252 and 258 are shorted to ground, thus isolating the receive circuitry from the antenna 160 and from the transmit path 307. Also, during the pre-transmit time 407, the control signal VC2 is held low, so no bias current flows through pin diode 310, thereby causing pin diode 310 to present a high impedance between the transmit path 307 and the antenna 160. The control signal VC3 reverse biases the pin diode 310, further maintaining its high impedance. Therefore, during the pre-transmit time 407, both the transmit path 307 and the receive path 319 are isolated from the antenna 160, thus achieving the desired effect of blocking any power from either of these paths to the antenna 160.

At the end of the pre-transmit time 407, and when it is desirable to begin transmitting, the control signal VC2 412 is enabled, thus forward biasing both the first pin diode 310 and the second pin diode 320. The transmit time is indicated at 415. When the first pin diode 310 is forward biased, the transmit power from the transmit circuitry is allowed to flow from transmit path 307 through the first pin diode 310 to the antenna 160. Since the bias current supplied by VC2 also flows through the second pin diode 320, the second pin diode 320 is forward biased, creating a short (i.e. a substantially zero impedance) from node 319 to ground. The ¼ wave transmission line 314, which rotates the impedance at node 319 by 180° to present an infinite impedance at node 312, ensures that the transmit power from transmit path 307 flows only to the antenna, and not to ground through the second pin diode 320.

When it is desirable to transmit, in one embodiment the control signal VC3 remains enabled while the control signal VC2 is also enabled, thus, the bias current of pin diode 320 is equal to the sum of bias currents supplied by VC2 and VC3. In this embodiment, the control signal VC3 410 is conveniently derived from the control signal TXen 408.

In an alternative embodiment, the control signal VC3 410 is shifted to logic low during the transmit time 415. In such an embodiment, the resistor 317 draws some current away from the pin diode 320, but the pin diode 320 still provides an adequate short to ground.

In another alternative embodiment, the connection 316 (VC3) is an open circuit during the transmit time 415, thus neither adding nor drawing current from the pin diode 320. Alternatively, the control signals VC3 and VC4 can be common and driven from, for example, the TXen signal.

During times outside the transmit time 415 and the pre-transmit time 407, the communication device may be in receive mode, or it may be idle. During these times, both VC2 and VC3 are held low, so no bias current is supplied to pin diode 310 or to pin diode 320. Therefore, the pin diode 310 and pin diode 320 each exhibit a high impedance. The pin diode 310 isolates the transmit path 307 from the antenna 160. The pin diode 320 does not short any signals to ground. Therefore, any signal received at antenna 320 is connected to receive path 319 and thereby to the surface acoustic wave filters 252 and 258.

Figure 7:
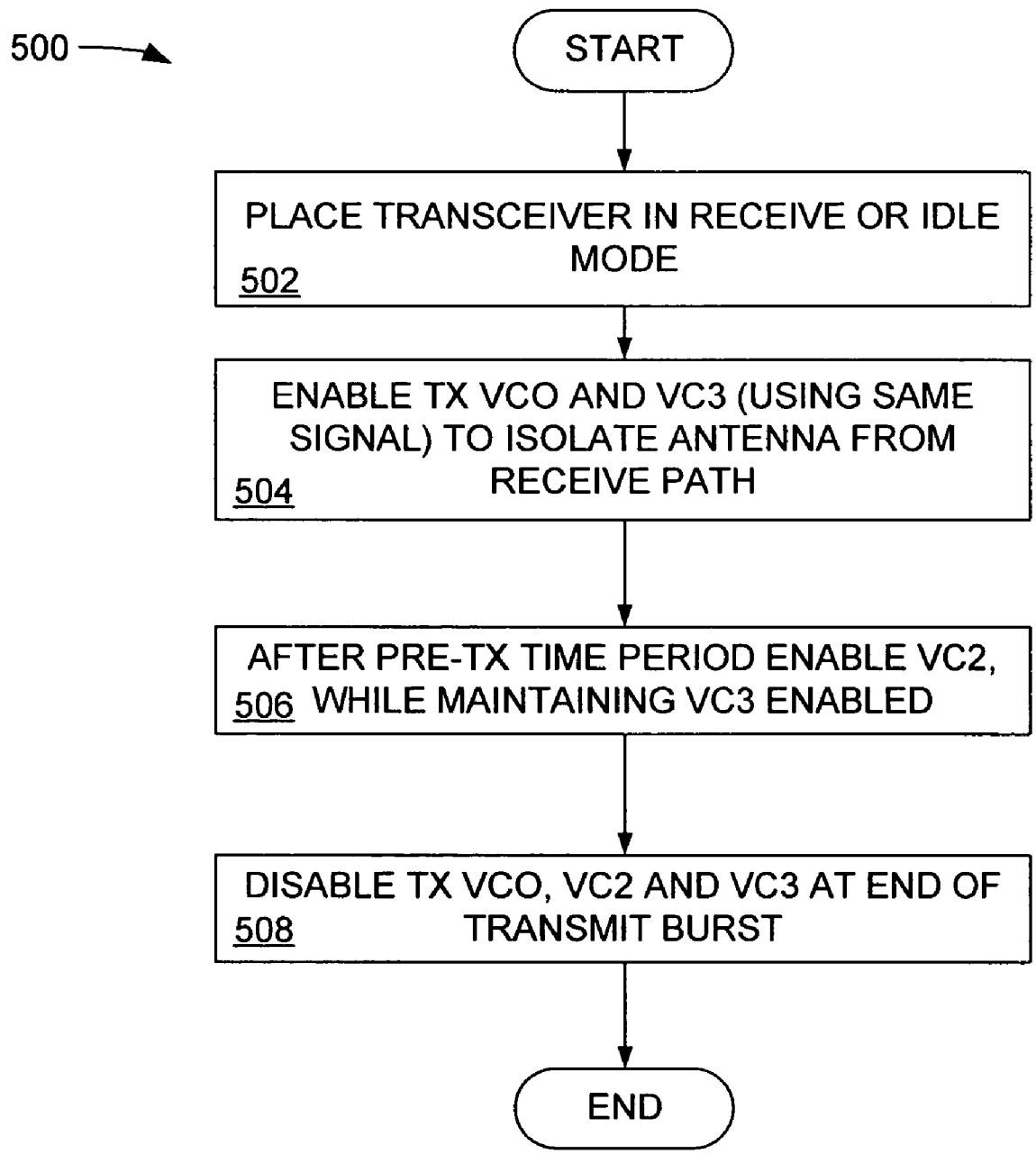
FIG. 7 is a flow chart describing the operation of one embodiment of the transmit-receive switch architecture.

FIG. 7 is a flow chart 500 describing the operation of one embodiment of the transmit-receive switch architecture. The blocks in the flow chart may be performed in the order shown, out of the order shown, or in parallel. In block 502, the portable communication device 100 is placed in a receive mode or in an idle mode. The transmit-receive architecture in FIG. 5 is configured so that the first pin diode 310 and the second pin diode 320 are unbiased or reverse biased. In block 504, the TX VCO 270 (FIG. 4) is enabled by making the TXen signal logic high and the control signal VC3 is enabled, forward biasing the pin diode 320, thus isolating the antenna 160 from the receive port 319. This effectively shorts the receive port 319 to ground. The TXen signal and the VC3 signal may be sourced from the same signal.

In block 506, and after the pre-transmit time, the control signal VC2 is enabled and applied to the first pin diode 310, thus enabling the passage of transmit power through the first pin diode 310 to the antenna 160. While the control signal VC2 is logic high, the second pin diode 320 is also forward biased, thus maintaining the short between the receive port 319 and ground. In a preferred embodiment the control signal VC3 also remains at logic high. In block 508, and after the transmit burst, the TX VCO 270 is disabled, and both VC2 and VC3 are disabled.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for preventing leakage of transmit power through receive circuitry, comprising:
    coupling a first switch between transmit circuitry and to an antenna;
    coupling a second switch between receive circuitry and ground; and
    separately controlling the first switch to remain non-conductive during a pre-transmit time period and controlling the second switch to couple the receive circuitry to ground during the pre-transmit time period in which a power source associated with the transmit circuitry is enabled.

2. The method of claim 1, further comprising coupling the transmit circuitry to the antenna, while the second switch remains controlled to couple the receive circuitry to ground.

3. The method of claim 2, further comprising coupling a transmission line between the first switch and the second switch, the transmission line providing a high impedance between the transmit circuitry and the receive circuitry.

4. The method of claim 3, further comprising implementing the first and second switches using pin diodes.

5. The method of claim 3, further comprising rotating the impedance between the transmit circuitry and the receive circuitry by 180 degrees.

6. The method of claim 3, further comprising controlling the first and second switches by a logic signal provided by baseband circuitry.

7. A transmit-receive switch architecture, comprising:
    a first switch coupled to transmit circuitry and to an antenna, the first switch configured to receive a first control signal; and
    a second switch coupled to receive circuitry and to ground, the second switch configured to receive a second control signal, wherein the first switch and the second switch are separately controlled and the first switch is configured to remain non-conductive during a pre-transmit time period, and the second switch is configured to couple the receive circuitry to ground during the pre-transmit time period in which a power source associated with the transmit circuitry is enabled.

8. The transmit-receive switch architecture of claim 7, wherein the first switch is configured to couple the transmit circuitry to the antenna, while the second switch remains configured to couple the receive circuitry to ground.

9. The transmit-receive switch architecture of claim 8, further comprising a transmission line coupled between the first switch and the second switch, the transmission line configured to provide a high impedance from the transmit circuitry toward the receive circuitry.

10. The transmit-receive switch architecture of claim 9, wherein the first and second switches are pin diodes.

11. The transmit-receive switch architecture of claim 9, wherein the transmission line is a ¼ wave transmission line configured to rotate the impedance between the transmit circuitry and the receive circuitry by 180 degrees.

12. The transmit-receive switch architecture of claim 9, wherein the first and second switches are controlled by a logic signal provided by baseband circuitry.

13. A portable transceiver, comprising:
    transmit and receive circuitry;
    a first switch coupled to the transmit circuitry and to an antenna, the first switch configured to receive a first control signal; and
    a second switch coupled to receive circuitry and to ground, the second switch configured to receive a second control signal, wherein the first switch and the second switch are separately controlled and the first switch is configured to remain non-conductive during a pre-transmit time period, and the second switch is configured to couple the receive circuitry to ground during the pre-transmit time period in which a power source associated with the transmit circuitry is enabled.

14. The portable transceiver of claim 13, wherein the first switch is configured to couple the transmit circuitry to the antenna, while the second switch remains configured to couple the receive circuitry to ground.

15. The portable transceiver of claim 14, further comprising a transmission line coupled between the first switch and the second switch, the transmission line configured to provide a high impedance from the transmit circuitry toward the receive circuitry.

16. The portable transceiver of claim 15, wherein the first and second switches are pin diodes.

17. The portable transceiver of claim 15, wherein the transmission line is a ¼ wave transmission line configured to rotate the impedance between the transmit circuitry and the receive circuitry by 180 degrees.

18. The portable transceiver of claim 15, wherein the first and second switches are controlled by a logic signal provided by baseband circuitry.

19. A transmit-receive switch architecture, comprising:
    first means for coupling transmit circuitry to an antenna, the first means configured to receive a first control signal;
    second means for coupling receive circuitry to ground, the second means configured to receive a second control signal; and
    third means for separately controlling the first means and the second means, the first means configured to remain non-conductive during a pre-transmit time period, and the second means coupling the receive circuitry to ground during the pre-transmit time period in which a power source associated with the transmit circuitry is enabled.

20. The transmit-receive switch architecture of claim 19, further comprising fourth means for coupling the transmit circuitry to the antenna, while the third means couples the receive circuitry to ground.

21. The portable transceiver of claim 20, further comprising means for providing a high impedance from the transmit circuitry toward the receive circuitry.

* * * * *